C. TESKE.
Watch Regulator.

No. 168,429. Patented Oct. 5, 1875.

Witnesses.
A. Ruppert.

Inventor.
C. Teske
D. P. Holloway & Co
Atty

UNITED STATES PATENT OFFICE.

CHARLES TESKE, OF SARATOGA SPRINGS, NEW YORK.

IMPROVEMENT IN WATCH-REGULATORS.

Specification forming part of Letters Patent No. 168,429, dated October 5, 1875; application filed August 19, 1875.

*To all whom it may concern:*

Be it known that I, CHARLES TESKE, of Saratoga Springs, in the county of Saratoga and State of New York, have invented a new and useful Improvement in Watch-Regulators, of which the following is a specification:

This invention relates to an improvement on Letters Patent of the United States No. 156,046, dated October 20, 1874; and consists in the means of forming the connection between the traveling nut and the regulator-arm.

In my said patent the connection between the traversing nut and the regulator-arm was made by means of a slitted pivot on the nut. This construction is somewhat difficult to make, but is particularly objectionable because there is apt to be some lost motion in the joints. To avoid these difficulties I form spring-jaws in the shape of calipers on the traversing-nut, which jaws, terminating in fine points nearly touching each other, embrace and clamp onto the regulator-arm, holding it firmly, as in a vise, and still allowing the regulator-arm to assume any probable obliquity with reference to the nut consequent upon any adjustment of the parts.

I do not claim, broadly, the use of spring jaws or fingers in watch-regulators, for the purpose of avoiding lost motion on adjusting the parts, but confine myself to the adaptation of spring caliper-shaped jaws to a watch-regulator of the construction shown in my said patent—that is, for connecting the nut and the regulator-arm, the caliper shape, or an equivalent shape, being of essence in this instance, in order to allow the end of the regulator-arm within the spring-jaws to oscillate to the right and to the left.

In my said original Letters Patent the general construction and object of my improvement are fully set forth, and need not be repeated herein. The modifications in construction are intended to simplify and cheapen it, and will be described.

Figure 1:
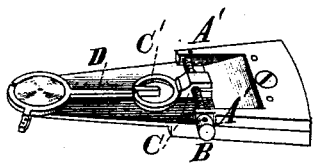
Figure 2:
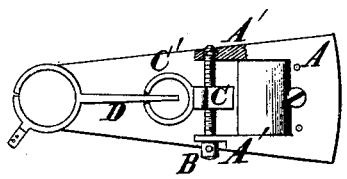
Figure 3:

In the annexed drawings, making a part of this specification, Figure 1 is a perspective view, Fig. 2 is a plan view, and Fig. 3 is an elevation, of the screw.

A is the steel bridge, having projections A' on each side, to receive the screw B, which passes through one projection (the hole not threaded) and received in a hole in the other, in which it is fastened by a pin passing downward, so as to be received in the circular groove near the end of the screw. This furnishes solid bearings for the screw, instead of the elastic plate indicated in said former Letters Patent by the letter H. Two holes are bored through the head of the screw at right angles to one another, and a very fine thread is formed upon the screw. The nut C is cut as set forth in said former Letters Patent, and made to fit closely upon the thread of the screw, and moving in one direction or the other as the screw is turned. On the side of the nut is a clutch, C', made of a split steel ring, having given to it such tension that it will hold, as in jaws, the free end of the regulator-arm D, carrying it with the nut as it traverses the screw in one direction or the other, and without binding too rigidly, as the regulator-arm will slide in the jaws.

What I claim as my invention, and desire to secure by Letters Patent, is—

In combination with the regulator-arm and headed screw turning in fixed bearings, the traversing-nut C, connected with the arm by the elastic caliper-shaped jaws C', substantially as set forth.

In testimony whereof I have signed my name to this specification in the presence of two subscribing witnesses.

CHARLES TESKE.

Witnesses:
 ARTHUR CAMP,
 CHAS. GRANGER.